US012644821B2

(12) United States Patent (10) Patent No.: US 12,644,821 B2
Finan et al. (45) Date of Patent: Jun. 2, 2026

(54) SAMPLE STREAM CENTRATION

(71) Applicant: Life Technologies Corporation, Carlsbad, CA (US)

(72) Inventors: Eric Finan, Eugene, OR (US); Michael Ward, Eugene, OR (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 661 days.

(21) Appl. No.: 17/729,440

(22) Filed: Apr. 26, 2022

(65) Prior Publication Data

US 2022/0349807 A1 Nov. 3, 2022

Related U.S. Application Data

(60) Provisional application No. 63/180,151, filed on Apr. 27, 2021.

(51) Int. Cl.
*G01N 15/14* (2024.01)
*G01N 15/1404* (2024.01)

(52) U.S. Cl.
CPC ..... *G01N 15/1459* (2013.01); *G01N 15/1404* (2013.01); *G01N 2015/142* (2013.01)

(58) Field of Classification Search
CPC ........... G01N 15/1459; G01N 15/1404; G01N 2015/142; G01N 15/1409; G01N 2015/1413
See application file for complete search history.

(56) References Cited

U.S. PATENT DOCUMENTS

| | | | |
|---|---|---|---|
| 8,134,705 B2 | 3/2012 | Kaduchak et al. | |
| 8,227,257 B2 | 7/2012 | Ward et al. | |
| 8,309,408 B2 | 11/2012 | Ward et al. | |
| 8,865,476 B2 | 10/2014 | Ward et al. | |
| 8,900,870 B2 | 12/2014 | Ward et al. | |
| 9,457,139 B2 | 10/2016 | Ward et al. | |
| 10,969,325 B2 | 4/2021 | Ward et al. | |
| 2005/0052184 A1* | 3/2005 | Haner .................. | G01R 33/307 |
| | | | 324/321 |
| 2008/0205739 A1 | 8/2008 | Hayenga et al. | |

(Continued)

FOREIGN PATENT DOCUMENTS

| | | |
|---|---|---|
| CN | 217981187 U | 12/2022 |
| JP | 2007505291 A | 3/2007 |

(Continued)

OTHER PUBLICATIONS

Wu M, Ozcelik A, Rufo J, Wang Z, Fang R, Jun Huang T. Acoustofluidic separation of cells and particles. Microsyst Nanoeng. Jun. 3, 2019 (Year: 2019).*

*Primary Examiner* — Natalie Huls

(57) ABSTRACT

Provided are, inter alia, flow centration components that can be used in flow cytometers and other applications. A flow centrator can define central axis, a proximal end, and a distal end, and having a central bore extending within the flow centration component in the direction of the central axis; the flow centration component defining a splined outer surface that defines a plurality of circumferentially arranged bypass flute channels, the plurality of bypass flute channels extending in the direction of the central axis, and each of the bypass flute channels having a depth and a length. Also provided are related methods that utilize the disclosed components.

10 Claims, 16 Drawing Sheets

(56)                    References Cited

U.S. PATENT DOCUMENTS

2008/0311005  A1    12/2008  Kim et al.
2009/0029870  A1*    1/2009  Ward  ................... G01N 21/645
                                                                  210/695
2012/0138152  A1     6/2012  Villarruel et al.
2014/0147860  A1*    5/2014  Kaduchak  ........ G01N 33/56966
                                                                  435/7.21

FOREIGN PATENT DOCUMENTS

JP          2010519547  A    6/2010
JP          2016027346  A    2/2016

* cited by examiner

SAMPLE STREAM CENTRATION

CROSS-REFERENCE TO RELATED APPLICATIONS

This application claims priority to and the benefit to U.S. Provisional Application No. 63/180,151, "Sample Stream Centration" (filed Apr. 27, 2021), the entirety of which is incorporated by reference herein for any and all purposes.

TECHNICAL FIELD

The present disclosure relates to the field of fluid sample handling and also to the field of particle cytometry.

BACKGROUND

In flow cytometry, it is critical for data quality to have the particles under interrogation in a flow cytometer to pass through the center of the illuminating laser. This is a challenge to manufacture repeatedly due to general machining tolerances, the cost of precision and the fluid dynamics of the interrogation assembly. Accordingly, there is a long-felt need in the field for systems and methods that ensure that particles are properly positioned in the flow cell across all flow rates during interrogation.

SUMMARY

In meeting the described needs, the present disclosure provides flow centration components, comprising: the flow centration component defining a central axis, a proximal end, and a distal end, and having a central bore extending within the flow centration component in the direction of the central axis; the flow centration component defining a splined outer surface that defines a plurality of circumferentially arranged bypass flute channels, the plurality of bypass flute channels extending in the direction of the central axis, and each of the bypass flute channels having a depth $H_F$ and a length $L_F$, and the outer surface of the flow centration component defining a cross-sectional dimension that varies as measured along the central axis in the direction from the proximal end to the distal end.

Also provided are flow cell assemblies, the flow cell assembly comprising: a flow centration component according to the present disclosure; a sheath fluid delivery region, the sheath fluid delivery region in fluid communication with the plurality of bypass flute channels at a proximal end of the flow centration component, the sheath fluid delivery region being in fluid isolation from the central bore of the flow centration component at the proximal end of the flow centration component, the flow cell further comprising a focusing region, which focusing region is configured to contain fluid sample flow from the central bore of the flow centration component and sheath fluid flow from the plurality of bypass flute channels, the focusing region defining a central axis, and the flow cell being configured to center a sample fluid capillary engaged with the flow centration component on the central axis of the focusing region.

Further disclosed are methods, comprising: with a flow centration component according to the present disclosure, communicating (1) a fluid sample that comprises a plurality of particles through the central bore of the component; and (2) a sheath fluid within the bypass flute channels of the flow centration component, the communicating being performed such that the sheath fluid hydrodynamically concentrates at least some of the plurality of particles toward a central flow axis.

Also provided are analysis systems, comprising:
a particle handling train, the particle handling train comprising: a sample channel defining an axis of flow and configured to communicate a fluid sample comprising a plurality of particles disposed therein, and a plurality of sheath flow channels arranged circumferentially about the sample channel and arranged essentially parallel to the axis of flow, the plurality of sheath flow channels being configured so as to communicate a sheath fluid therethrough so as to hydrodynamically focus particles of the fluid sample to a central axis of a flow channel; and
a particle analyzer, the particle analyzer configured to analyze the hydrodynamically focused particles in the flow channel.

Further provided are methods, comprising: communicating a sheath fluid through discrete channels circumferentially arranged about a flow of a sample fluid that comprises a plurality of particles disposed therein, the communicating being performed such that the sheath fluid hydrodynamically concentrates at least some of the plurality of particles of the flow of the sample fluid toward a central flow axis.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings.

DETAILED DESCRIPTION OF ILLUSTRATIVE EMBODIMENTS

Figure 1:
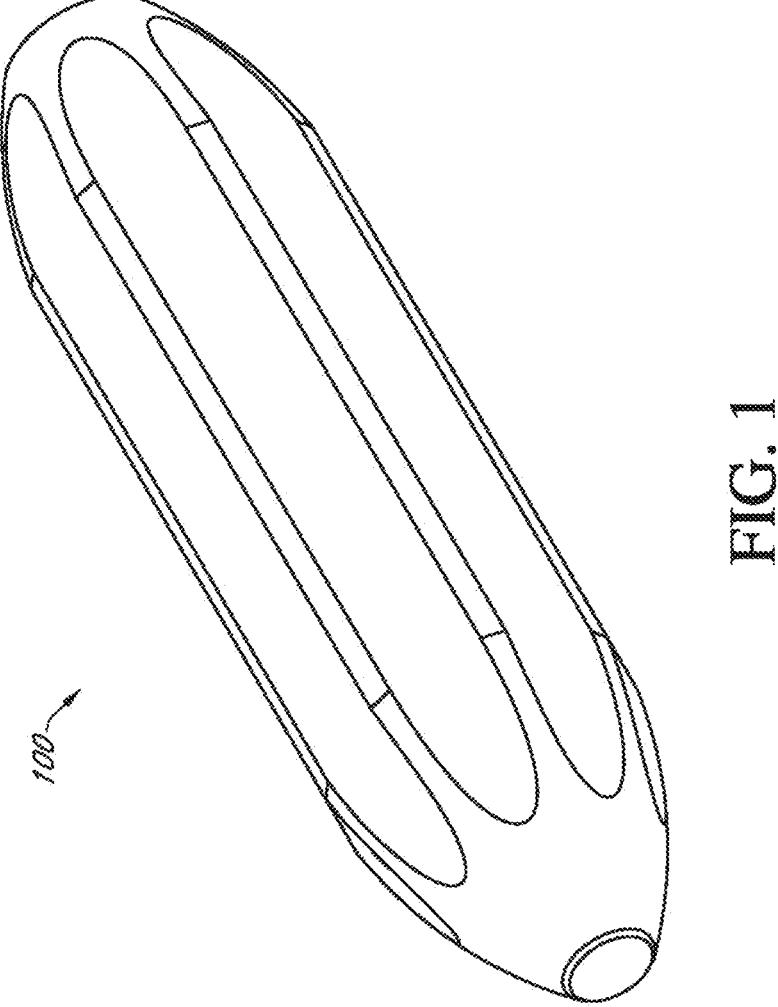
FIG. 1 provides an exterior view of an exemplary flow centrator according to the present disclosure.

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of" The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4. Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

FIGURES

The attached figures are illustrative only and do not serve to limit the scope of the present disclosure or the appended claims.

For the reader's convenience, the numbering of the various figure elements is summarized below:
- 100—centration component
- 102—central portion of flute
- 104—proximal region of centration component
- 106—proximal end of centration component
- 108—distal end of centration component
- 110—distal region of centration component
- 112—central bore
- 114—outer tube
- 116—central axis of flow centration component
- 118—central axis of central bore
- 120—flow channel
- 122—Transducer train
- 124—Flange of outer tube
- 126—Bypass flute channel FIG. 1 provides an exterior view of an exemplary flow centrator 100 according to the present disclosure. As shown, a flow centrator can define an elongate profile, with one or more bypass flute channels defined on the exterior of the flow centrator. A flow centrator can also define a tapered profile (e.g., a football-like profile), and can further define (as described elsewhere herein) a bore extending therethrough.

Figure 2:
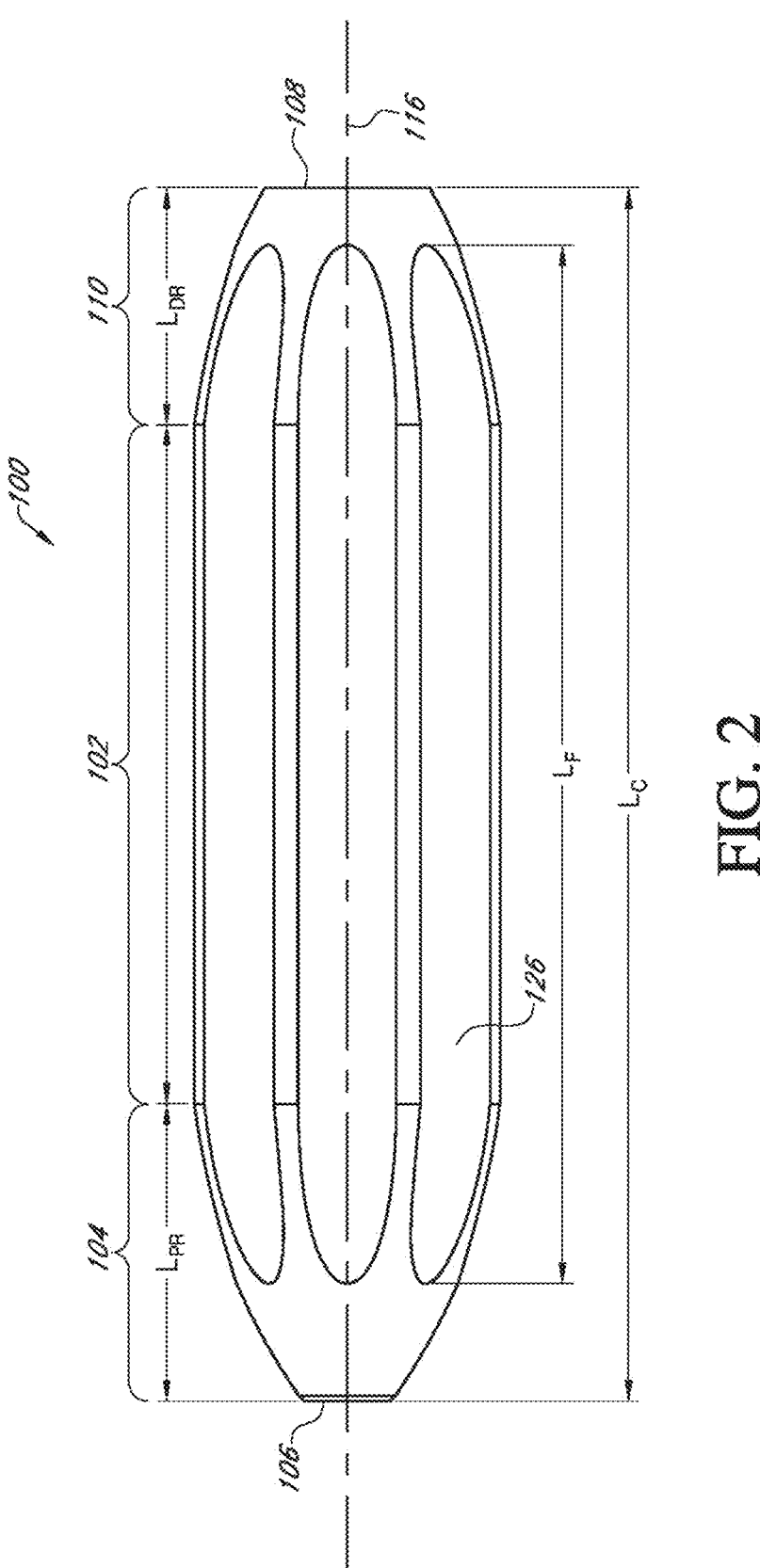
FIG. 2 provides a side view of the exemplary flow centrator of FIG. 1.

FIG. 2 provides a side view of the exemplary flow centrator of FIG. 1. As shown, flow centrator 100 can define a proximal region 104, a distal region 110, and a central region 102. Flow centrator 100 can also define a proximal end 106 and distal end 108.

Proximal region 104 can be symmetric to distal region 108; in some embodiments, proximal region 104 has a profile that can be superimposed exactly over distal region 110. This is not, however, a requirement, as proximal region 104 can define a profile that differs in one or more respects from the profile defined by distal region 110.

Proximal region 104 can define a length LPR, measured along the longitudinal axis of the flow centrator. Distal region 110 can define a length $L_{DR}$, measured along the central axis of the flow centrator, and flow centrator 100 can define a length $L_C$ defined along the central axis of the flow centrator. A bypass flute channel 126 can define a length $L_F$ defined along the central axis of the flow centrator.

Figure 3:
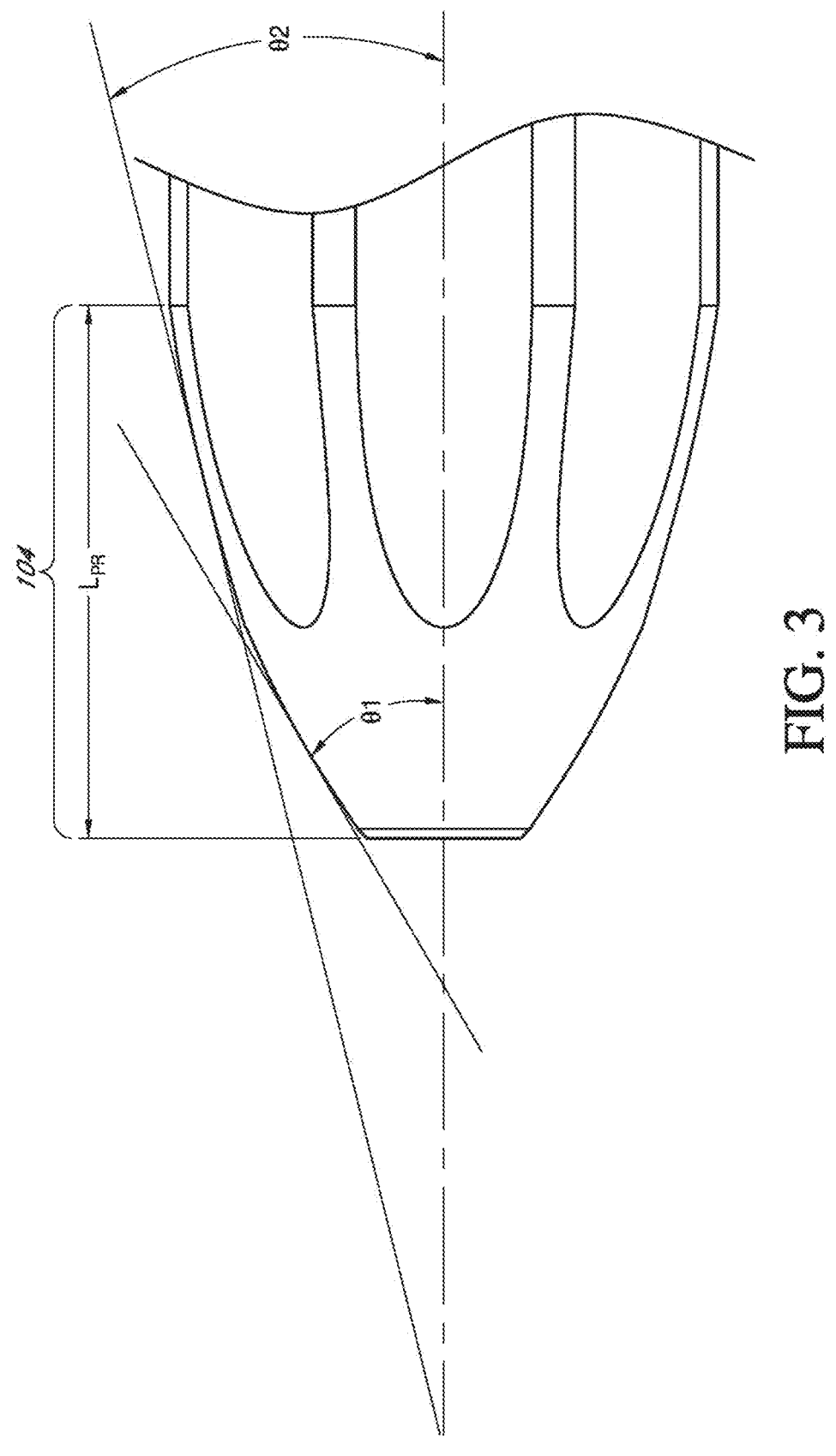
FIG. 3 provides a magnified view of the proximal portion of the exemplary flow centrator of FIG. 1.

FIG. 3 provides a magnified view of the proximal portion 104 of the exemplary flow centrator of FIG. 1. As shown, the profile of proximal portion can define a first angle θ1 and a second angle θ2, which angles can be measured relative to the central axis 116 of the flow centrator component. θ2 can be less than θ1, in some embodiments. This is not a requirement, however, as θ2 can be equal to θ1 in some embodiments and θ2 can even be greater than θ2 in some embodiments. θ1 can be in the range of from, e.g., about 10 to about 80 degrees, or from about 15 to about 75 degrees, or from about 20 to about 70 degrees, or from about 25 to about 65 degrees, or from about 30 to about 60 degrees, or from about 35 to about 55 degrees, or from about 40 to about 50 degrees, or even about 45 degrees.

θ2 can be in the range of from, e.g., about 5 to about 50 degrees, or from about 10 to about 45 degrees, or from about 15 to about 40 degrees, or from about 20 to about 35 degrees, or from about 25 to about 30 degrees.

Figure 4:
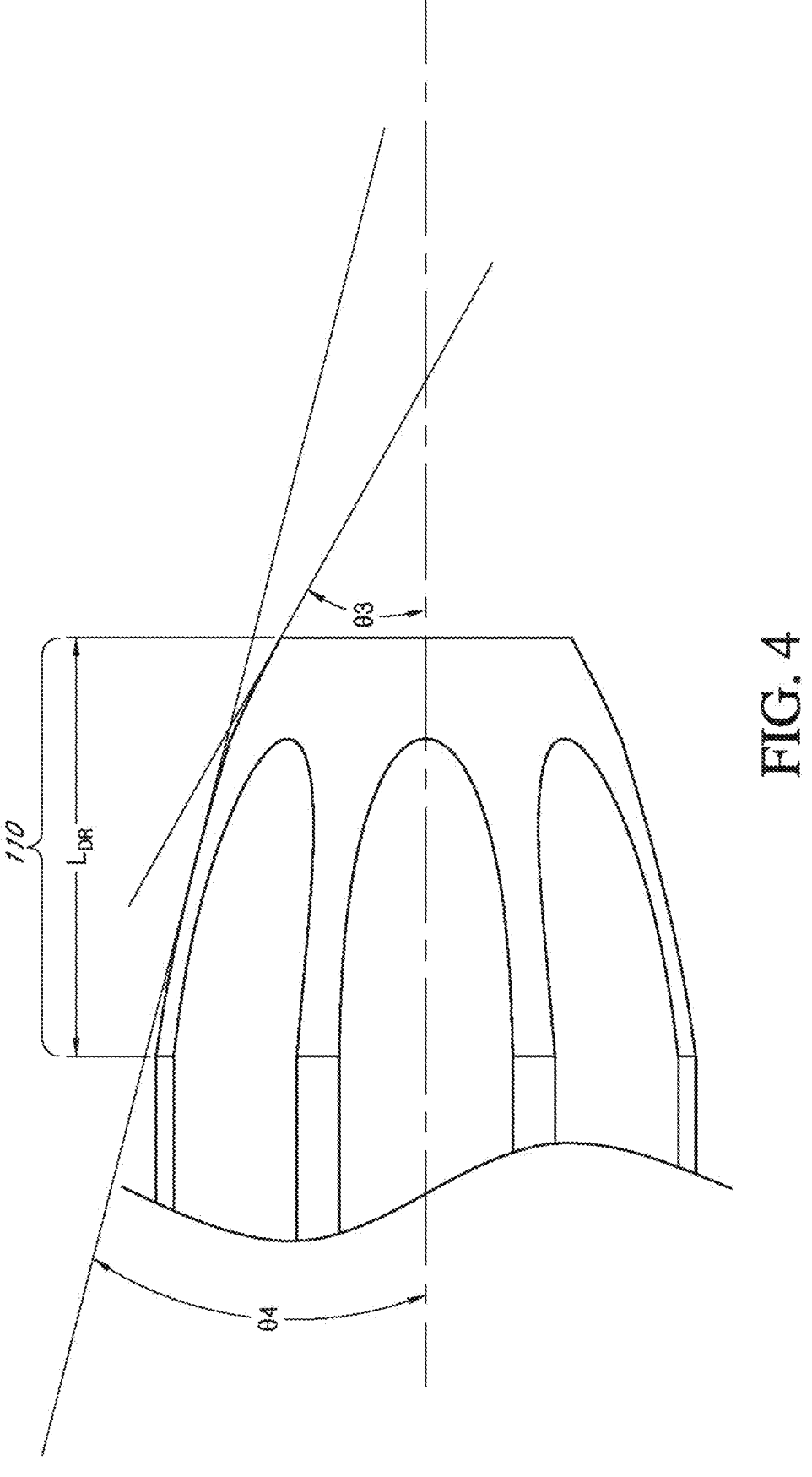
FIG. 4 provides a magnified view of the distal portion of the exemplary flow centrator of FIG. 1.

FIG. 4 provides a magnified view of the distal portion 100 of the exemplary flow centrator of FIG. 1. As shown, the profile of distal portion can define a third angle θ3 and a second angle θ4, which angles can be measured relative to the central axis 116 of the flow centrator component. θ4 can be less than θ3, in some embodiments. This is not a requirement, however, as θ4 can be equal to θ3 in some embodiments and θ4 can even be greater than θ3 in some embodiments. θ3 can be in the range of from, e.g., about 10 to about 80 degrees, or from about 15 to about 75 degrees, or from about 20 to about 70 degrees, or from about 25 to about 65 degrees, or from about 30 to about 60 degrees, or from about 35 to about 55 degrees, or from about 40 to about 50 degrees, or even about 45 degrees.

θ4 can be in the range of from, e.g., about 5 to about 50 degrees, or from about 10 to about 45 degrees, or from about 15 to about 40 degrees, or from about 20 to about 35 degrees, or from about 25 to about 30 degrees.

Figure 5:
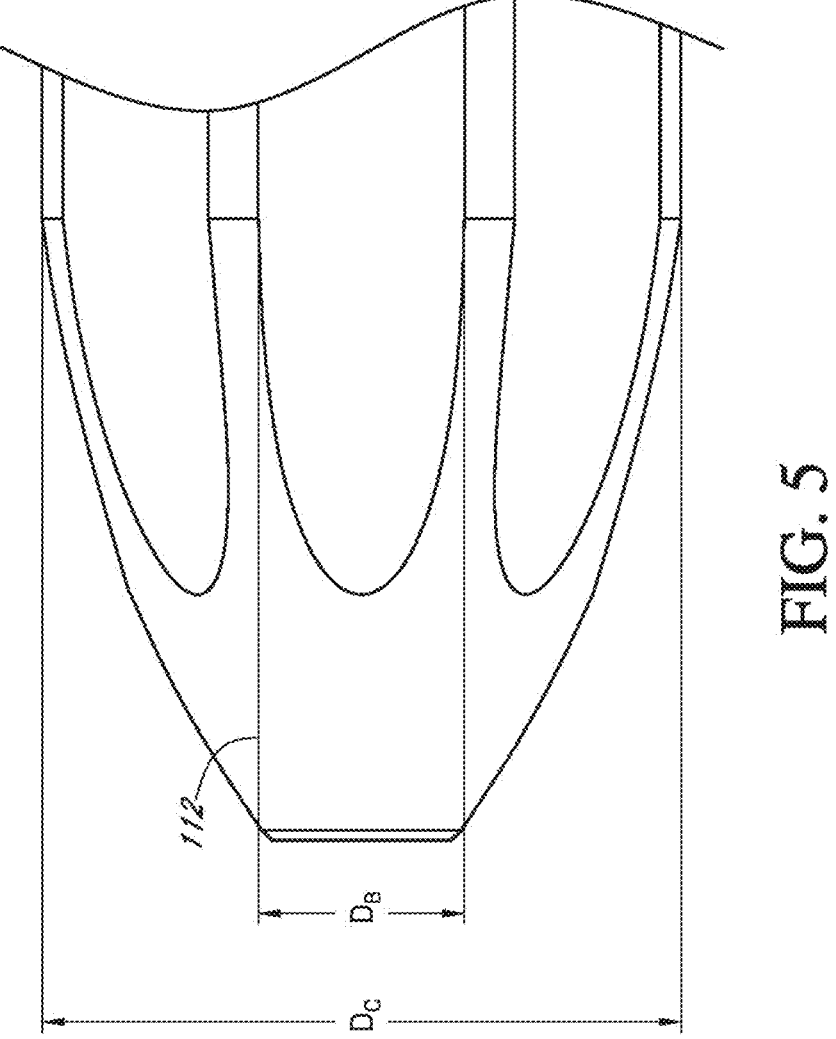
FIG. 5 provides an alternate magnified view of the proximal portion of the exemplary flow centrator of FIG. 1.

FIG. 5 provides an alternate magnified view of the proximal portion of the exemplary flow centrator of FIG. 1. As shown, central bore 112 can extend through the flow centrator component. Central bore 112 can define a diameter $D_B$, and the flow centrator can define a diameter $D_C$, which diameter can be measured across the flow centrator component at its widest.

Figure 6:
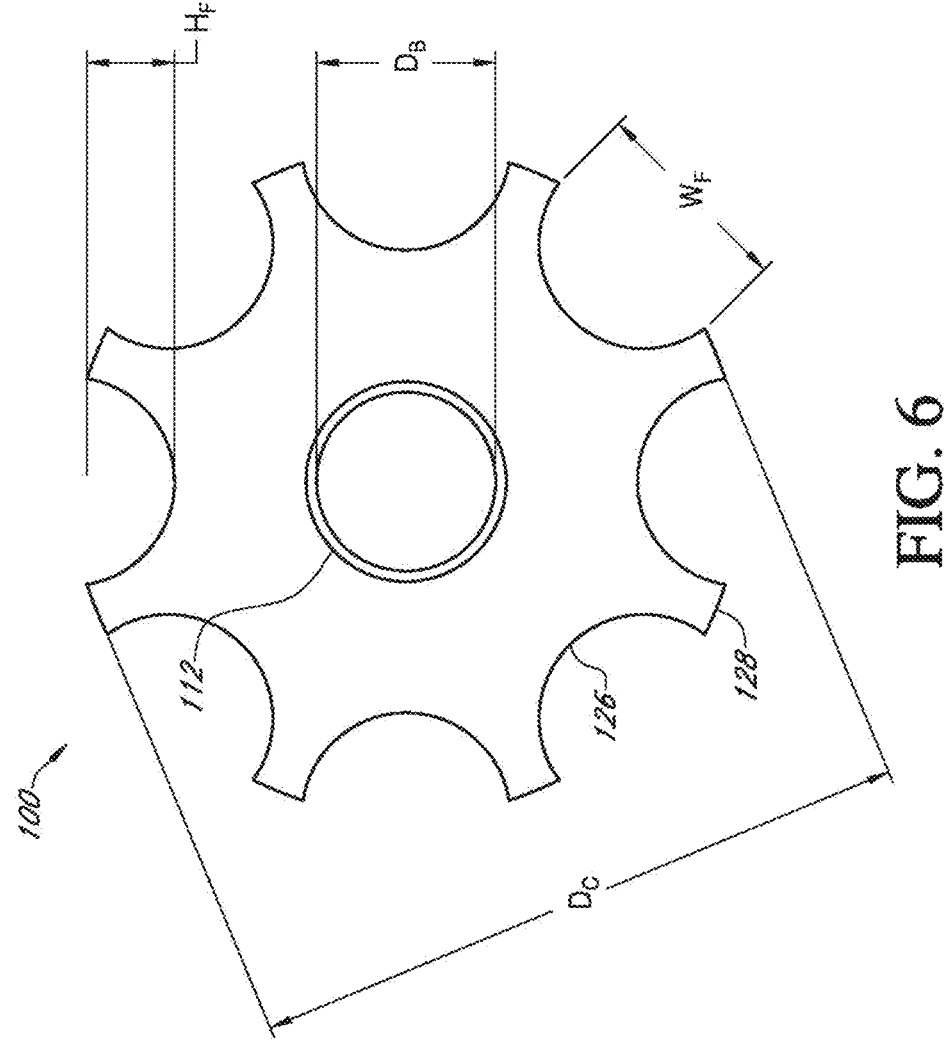
FIG. 6 provides an end-on view of the proximal portion of the exemplary flow centrator of FIG. 1.

FIG. 6 provides an end-on view of the proximal portion of the exemplary flow centrator of FIG. 1. As shown, flow centrator 100 can define central bore 112, which central bore defines a diameter $D_B$. A bypass channel flute 126 can define a height $H_F$, which is defined as the distance (measured radially outwardly from the central axis of the flow centrator 100) between the bottom of the bypass channel flute and a line that connects the tops of the splines (128) of the flow centrator component that define the bypass channel flute. As shown, a spline can have a varying width along its height. A bypass channel flute can also define a width $W_F$, which width is defined between the innermost points on the tops of the splines that define the flute.

Figure 7:
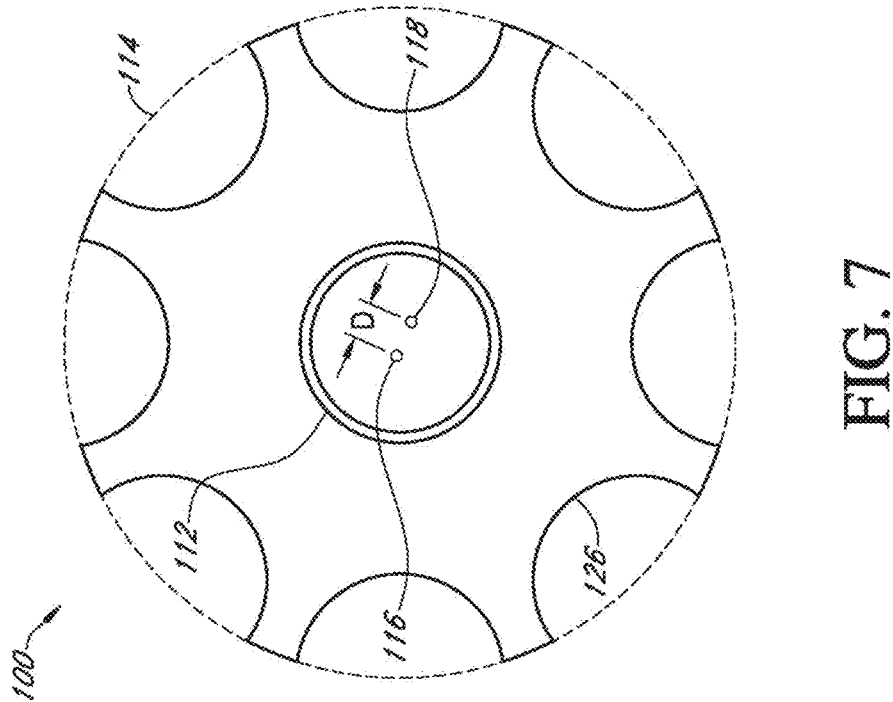
FIG. 7 provides an alternate end-on view of the proximal portion of the exemplary flow centrator of FIG. 1.

FIG. 7 provides an alternate end-on view of the proximal portion of the exemplary flow centrator of FIG. 1. As shown, a flow centrator component 100 can be positioned (e.g., via friction fit) within an outer tube 114 so as to define enclosed bypass flute channels (126) between the flow centrator component and the outer tube. FIG. 7 also illustrates the central axis 116 of the flow centration component and the central axis 118 of the central bore. These axes (116 and 118) can be separated by a distance D, when measured at one of the proximal end or the distal end of the flow centrator component. The distance D can be zero; the distance D can also be in the range of less than about 10 μm.

Figure 8:
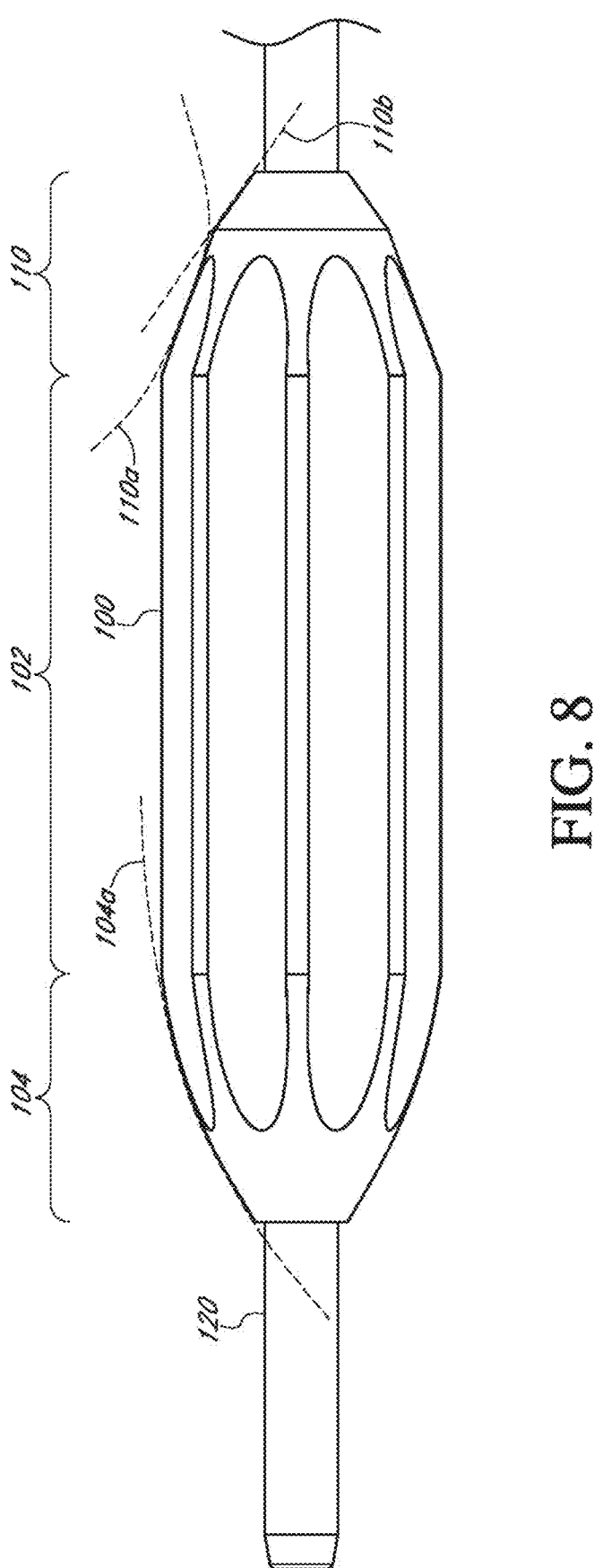
FIG. 8 provides a side view of the exemplary flow centrator of FIG. 1, engaged with an exemplary flow channel.

FIG. 8 provides a side view of the exemplary flow centrator of FIG. 1, engaged with an exemplary flow channel. As shown, a flow centrator 100 can be engaged with a flow channel 120, which flow channel can be within the central bore (not labeled) of the flow centrator component. The flow channel can contact the central bore directly, although this is not a requirement, as a flow centrator component can include a gasket, coating, washer, or other element that is disposed between the flow channel and the wall of the central bore of the flow centrator component.

As shown in FIG. 8, the proximal region 104 of a centrator can define a profile that includes a curved portion, e.g., a portion that is curved along curvature 104a. (The profile of the proximal region can also include a linear region; the profile of the proximal region can include one or more linear regions, one or more curved regions, or a linear region and a curved region.) Curvature 104a can, as shown, be concave toward the centrator. This is not a requirement, however, as curvature 104a can be concave away from the centrator. Curvature 104a can be defined by a constant radius, but this is not a requirement, as curvature 104a can define a varying curvature.

Also as shown in FIG. 8, the distal region 110 of the centrator can define a profile that includes a curved portion, e.g., a portion that is curved along curvature 110a. The profile of the distal region can also include a linear region such as shown by line 110b; the profile of the proximal region can include one or more linear regions, one or more curved regions, or a linear region and a curved region. Line 110b can be angled relative to the centerline (not shown) of the centrator by, e.g., from about 10 to about 80 degrees, or from about 15 to about 75 degrees, or from about 20 to about 70 degrees, or from about 25 to about 65 degrees, or from about 30 to about 60 degrees, or from about 35 to about 55 degrees, or from about 40 to about 50 degrees, or even about 45 degrees.

Curvature 110a can, as shown, be concave away from the centrator, as shown in FIG. 8. This is not, however, a requirement, as curvature 110a can be concave toward the centrator. Curvature 110a can be defined by a constant radius, but this is not a requirement, as curvature 110a can define a varying curvature.

Figure 9:
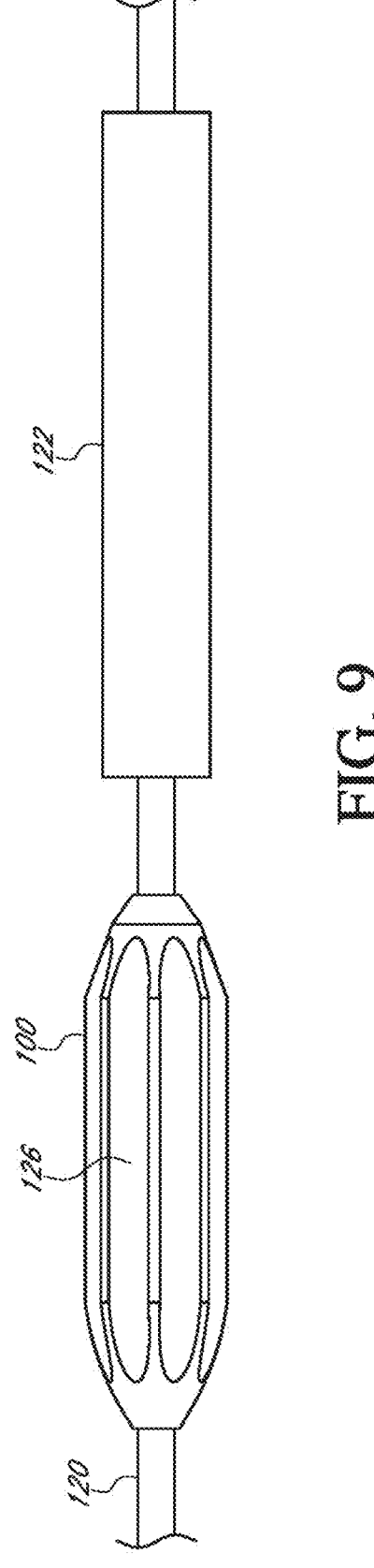
FIG. 9 provides a side view of the exemplary flow centrator of FIG. 1, engaged with an exemplary flow channel and an exemplary transducer train.

FIG. 9 provides a side view of the exemplary flow centrator of FIG. 1, engaged with an exemplary flow channel and an exemplary transducer train. As shown, a flow centrator 100 can be engaged with a flow channel 120, which flow channel can be within the central bore (not labeled) of the flow centrator component. The flow channel can contact the central bore directly, although this is not a requirement, as a flow centrator component can include a gasket, coating, washer, or other element that is disposed between the flow channel and the wall of the central bore of the flow centrator component.

A transducer train 122 can be engaged with flow channel 120. Transducer train 122 can include one or more transducers, which transducers can be configured to effect acoustic radiation pressure within flow channel 120.

Without being bound to any particular theory or embodiment, a system can be configured such that transducer 122 operates to effect acoustic focusing of particles disposed within flow channel 120. Exemplary such focusing is described in, e.g., "Particle Analyzing Systems And Methods Using Acoustic Radiation Pressure," U.S. patent application Ser. No. 16/282,793; "Medium Switching Systems and Methods Using Acoustic Radiation Pressure," U.S. Pat. No. 8,227,257; "Particle Switching Systems and Methods Using Acoustic Radiation Pressure" U.S. patent application Ser. No. 12/239,410; "Particle Imaging Systems and Methods Using Acoustic Radiation Pressure," U.S. Pat. No. 8,134,705; and "Particle Fusing Systems and Methods Using Acoustic Radiation Pressure," U.S. patent application Ser. No. 12/239,483; "Kits for Systems and Methods Using Acoustic Radiation Pressure," U.S. patent application Ser. No. 12/239,501; and "Particle Quantifying Systems and Methods Using Acoustic Radiation Pressure," U.S. Pat. No. 8,309,408, the entireties of which are incorporated herein for any and all purposes.

Hydrodynamic focusing can be effected by fluid communicated through the flute bypass channels 126 disposed about the exterior of flow centrator component 126. Again without being bound to any particular theory or embodiment, focusing fluid can be communicated through the flute bypass channels such that fluid exiting the channels effects hydrodynamic focusing of particles that have exited flow channel 120. In some embodiments, acoustic focusing takes place upstream of where hydrodynamic focusing takes place. This is not a requirement, however, as acoustic focusing can also take place downstream from where hydrodynamic focusing takes place.

Figure 10:
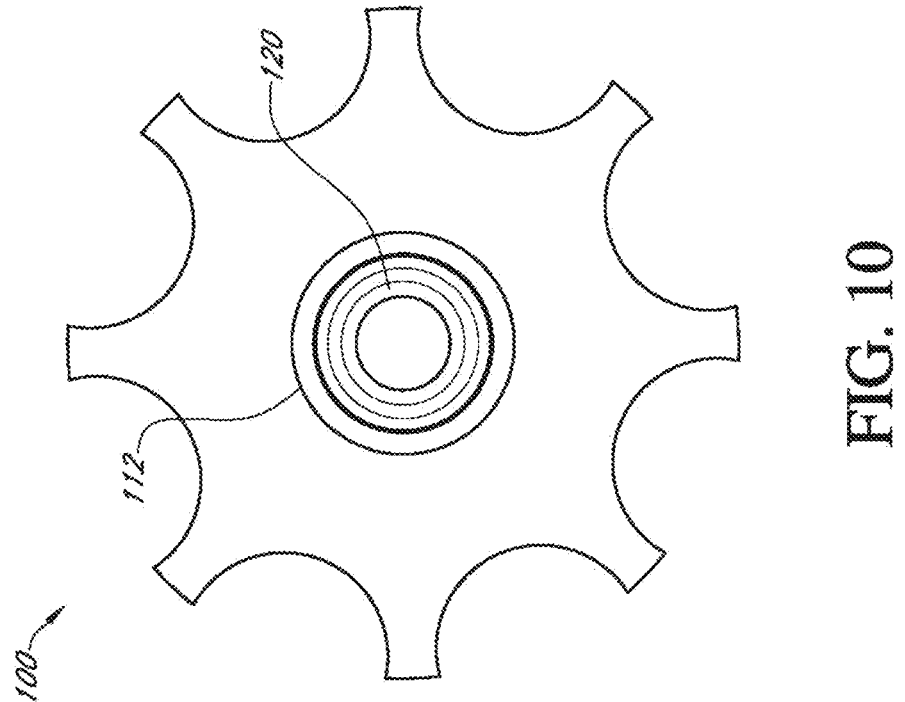
FIG. 10 provides an end-on view of the exemplary flow centrator of FIG. 1 engaged with an exemplary flow channel.

FIG. 10 provides an end-on view of the exemplary flow centrator of FIG. 1 engaged with an exemplary flow channel. As shown, flow channel 120 can be disposed within central bore 112 of flow centrator component 100.

Figure 11:
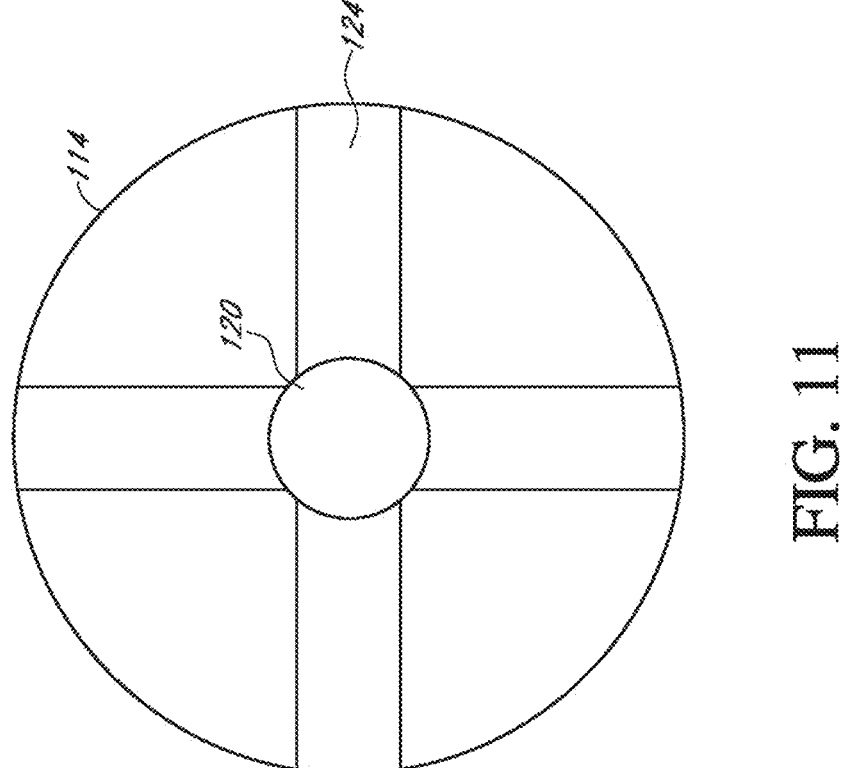
FIG. 11 provides an end-on view of an exemplary embodiment of the disclosed technology.

FIG. 11 provides an end-on view of an exemplary embodiment of the disclosed technology. As shown, flow channel 120 can be engaged with flanges 124, which flanges can extend from outer tube 114. Flanges 124 can be configured so as to define discrete flow channels between channels. Flanges 124 can be configured to maintain flow channel 120 in position when said flow channel is engaged with the flanges.

Figure 12:
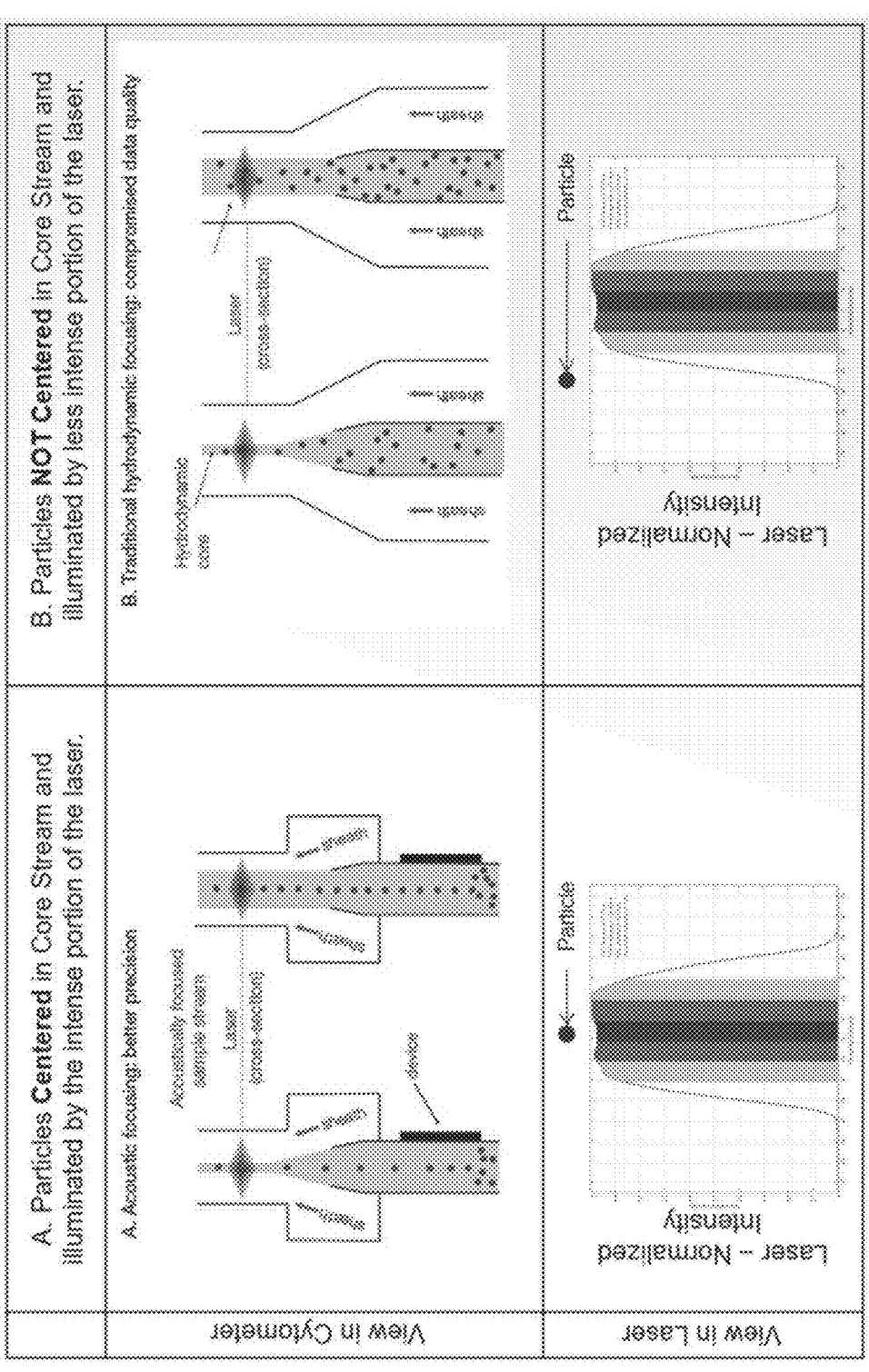
FIG. 12 illustrates the impact of centering particles in the core stream of an analysis device (e.g., a cytometer)

FIG. 12 illustrates the impact of centering particles in the core stream of an analysis device (e.g., a cytometer). As shown (left column), a particle that is centered in the core stream is illuminated by the relatively more intense portion of a laser configured to illuminate a sample within the core stream of the analysis device. Acoustic focusing can give rise to effective particle centering, and the acoustic focusing can be combined with hydrodynamic focusing that utilizes a sheath fluid approach. As shown (right column), particles that are not centered in the core stream are illuminated by a less intense portion of the laser. As shown, traditional sheath-fluid based hydrodynamic focusing (by itself) may not in all cases give rise to centered particles, and as a consequence, those particles may not be illuminated by the most intense portion of the illumination laser, thereby creating the possibility of sub-optimal data collection.

Figure 13:
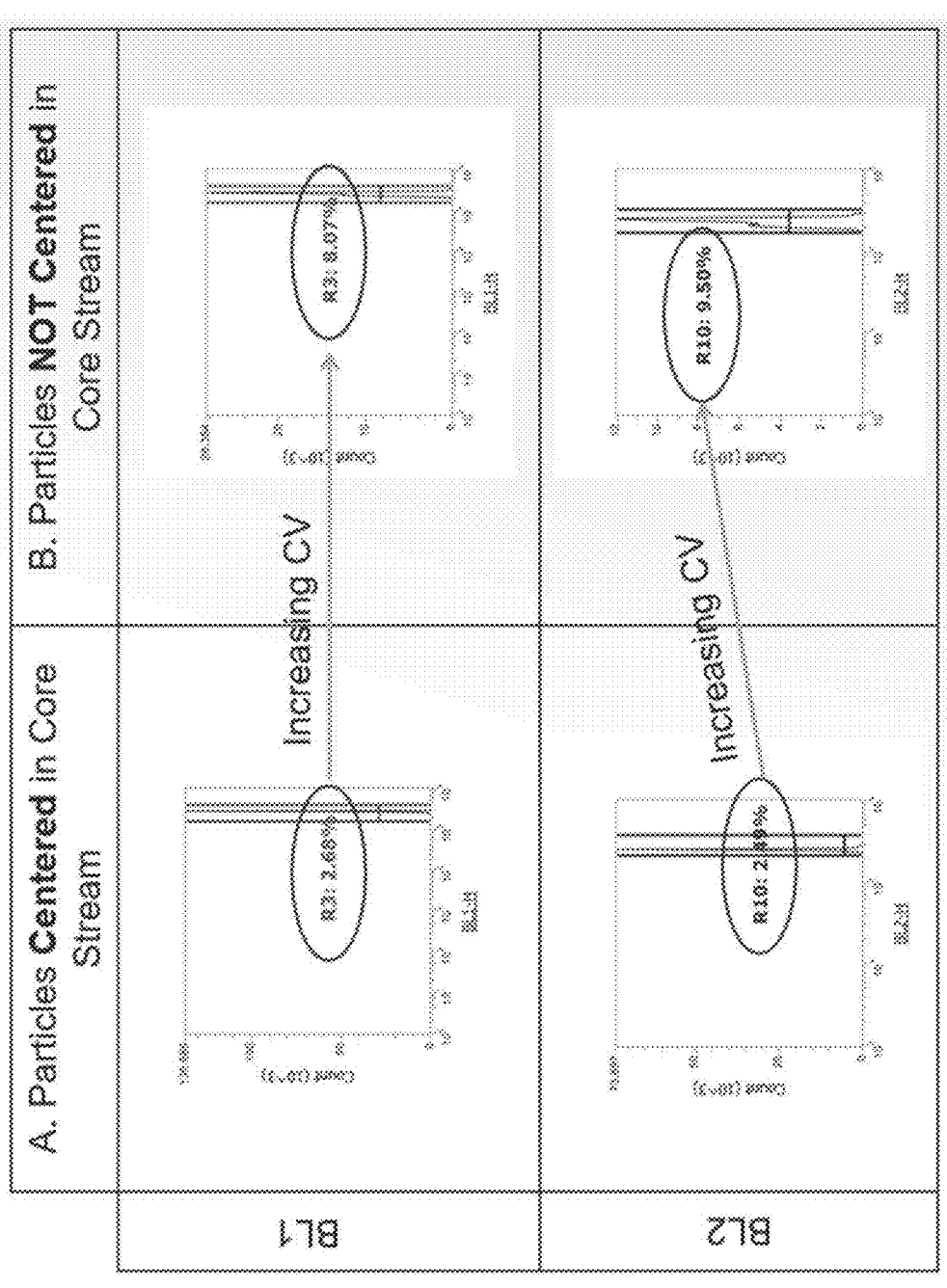
FIG. 13 provides an alternative illustration (by comparing CV) of the impact of centering particles in the core stream of the analysis device.

FIG. 13 provides an alternative illustration (by comparing CV) of the impact of centering particles in the core stream of the analysis device. As shown, the CV of a sample of particles centered in the core stream is relatively low compared to the CV of a sample of particles that are not centered in the core stream, thus providing a quantitative indicator of the effect of centering particles in the core stream.

Figure 14:
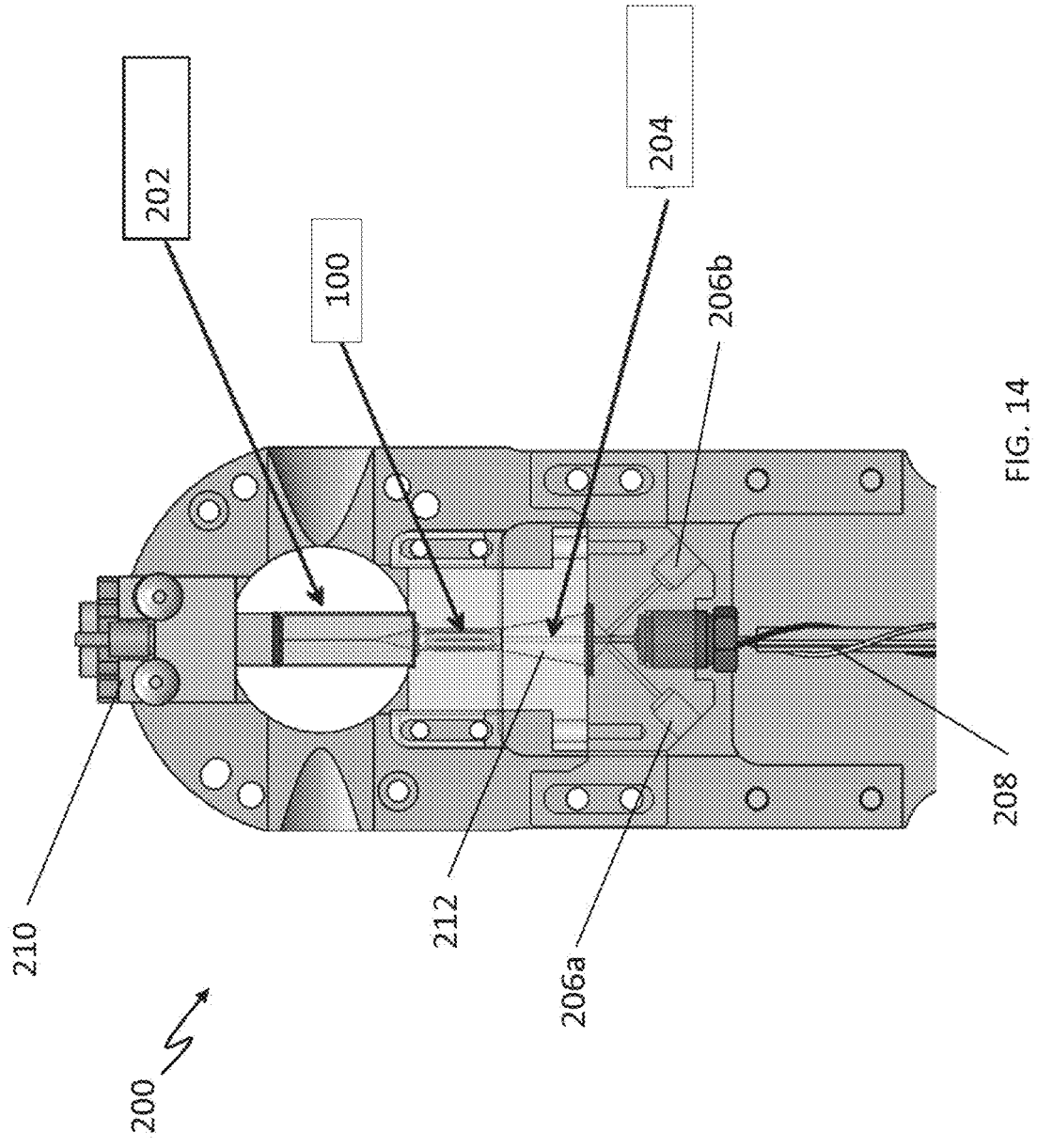
FIG. 14 provides a cutaway view of a portion of an analysis device that employs a centrator according to the present disclosure.

FIG. 14 provides a cutaway view of a portion of an analysis device 200 (e.g., a cytometer) that employs a centrator 100 according to the present disclosure. As shown, device 200 can include capillary 204, which capillary can carry a sample of interest (e.g., particles, cells, and the like). Sheath fluid from one or more sheath fluid sources (shown as 206a and 206b) can be delivered into manifold 212 located about capillary 204. Capillary 204 can deliver sample to the central bore (not labeled) of centrator 100, and manifold 212 can deliver sheath fluid to the bypass flute channels (not labeled) of centrator 100. The sheath fluid is then communicated along the bypass flute channels and then acts to center the material (particles cells) in the sample as that material exits the centrator to flow cell 202, thereby effecting centration of the material by the sheath fluid flow.

Analysis device 200 can optionally include a tapered portion at the exit end of the centrator, which tapered portion (which can be conical and can be part of the flow cell and/or the manifold) can further direct sheath fluid that has passed along the bypass flute channels of centrator 100 toward the center of the core stream. Material can be analyzed at region 210, e.g., via lasers or other instrumentation.

As explained elsewhere herein, acoustic focusing can be used alone or together with hydrodynamic focusing. For example, a cytometer according to the present disclosure can include an acoustic transducer, which acoustic transducer can be used to acoustically focus material (e.g., particles, cells) at or toward the center of the core stream. By reference to FIG. 14, analysis device 200 can include an acoustic transducer 208, which acoustic transducer can act to acoustically focus material (e.g., particles, cells) at or toward the center of the core stream; the acoustic transducer can be position upstream of centrator 100, but can also be positioned downstream of centrator 100.

Figure 15:
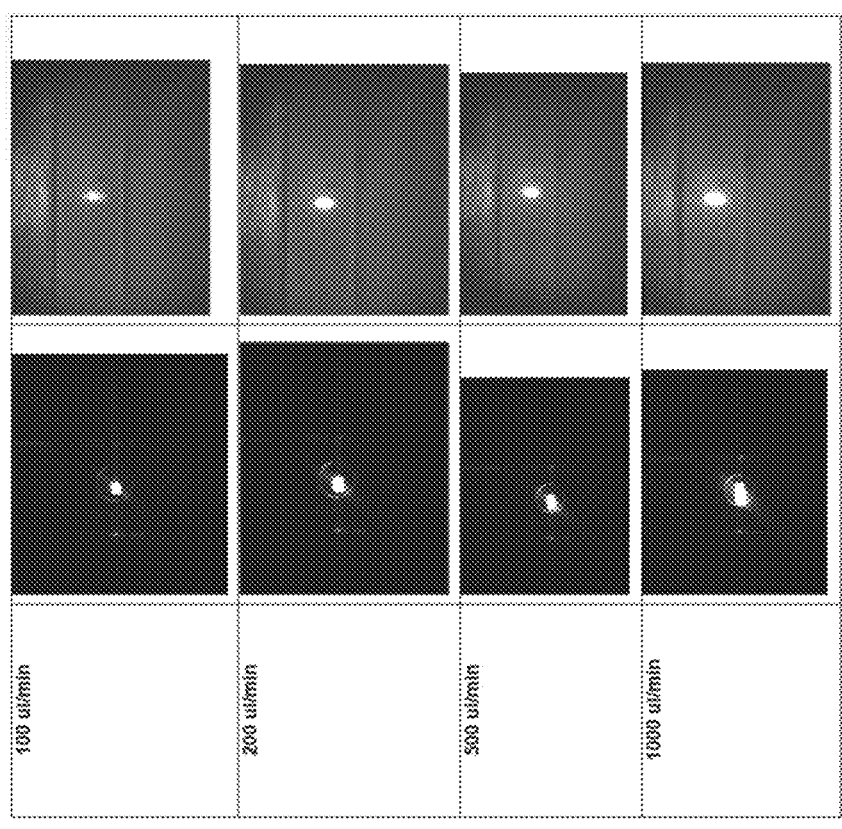
FIG. 15 provides exemplary SSC and FSC data (over a range of flowrates) for particles processed in an analysis device that employs a centrator according to the present disclosure.
Figure 15:
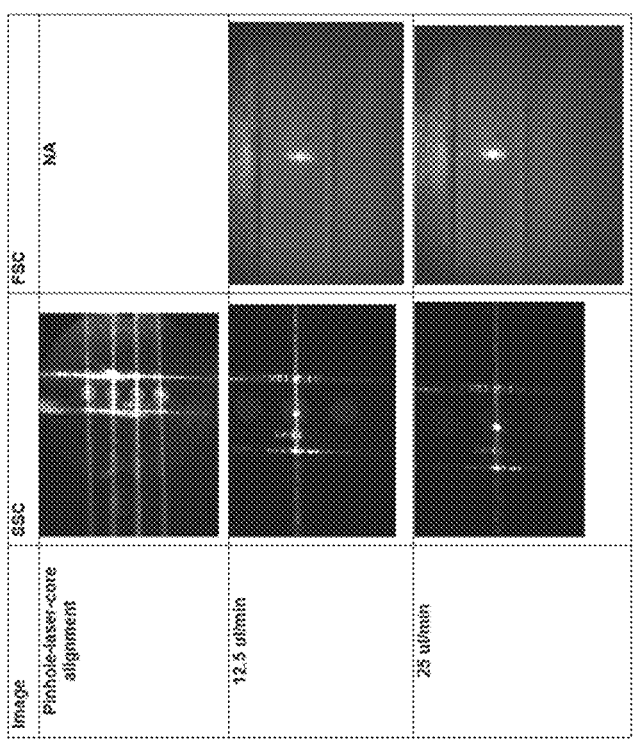

FIG. 15 provides exemplary SSC and FSC data (over a range of flowrates) for particles processed in an analysis device that employs a centrator according to the present disclosure. As shown by the SSC and FSC data, the use of a centrator according to the present disclosure can effect well-centered particles across a range of flow rates, e.g., from 12.5 μL/min to 1000 μL/min.

Figure 16:
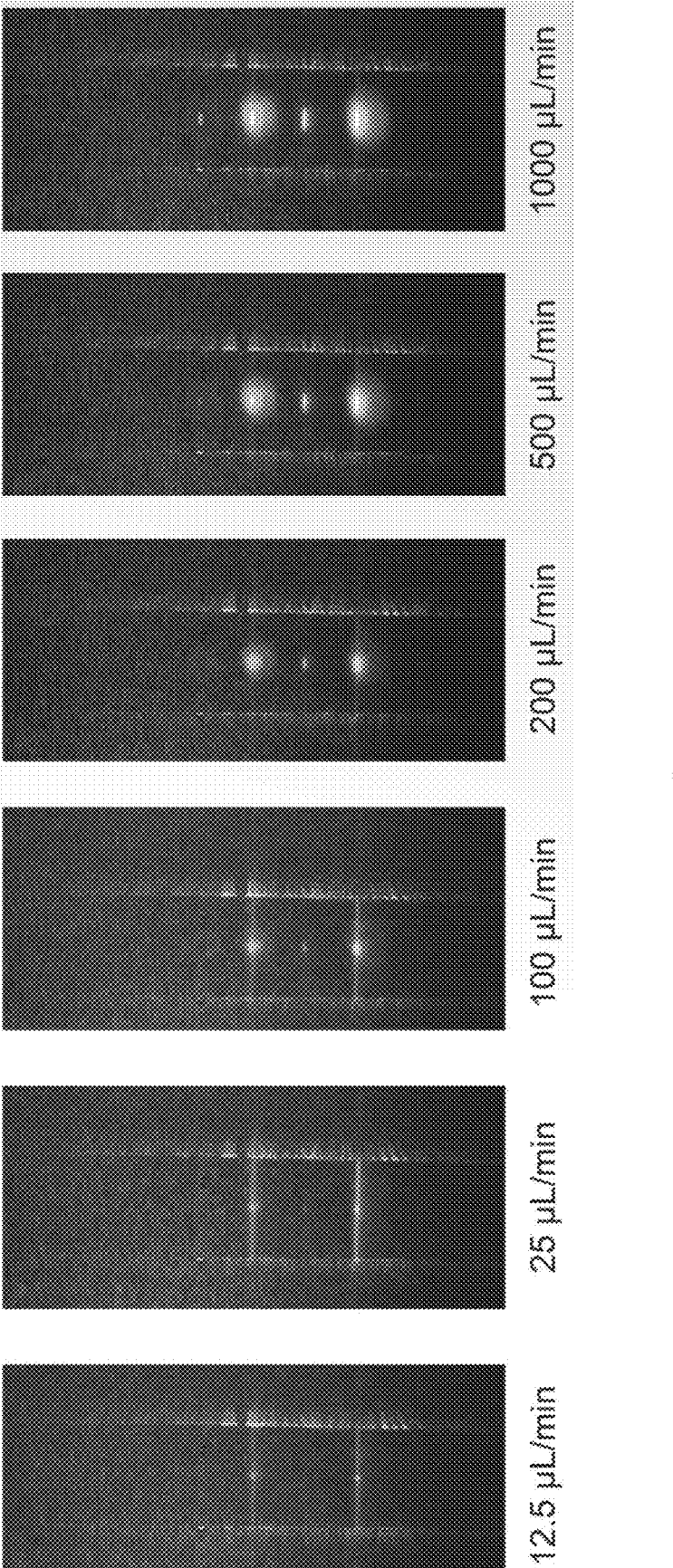
FIG. 16 provides exemplary SSC data (over a range of flowrates) for particles processed in an analysis device that employs a centrator according to the present disclosure.

FIG. 16 provides exemplary SSC data (over a range of flowrates) for particles processed in an analysis device that employs a centrator according to the present disclosure. As shown by the SSC data, the use of a centrator according to the present disclosure can effect well-centered particles across a range of flow rates, e.g., from 12.5 μL/min to 1000 μL/min.

Aspects

The following Aspects are illustrative only and do not limit the scope of the present disclosure or the appended claims.

Aspect 1. A flow centration component, comprising: the flow centration component defining a central axis, a proximal end, and a distal end, and having a central bore extending within the flow centration component in the direction of the central axis; the flow centration component defining a splined outer surface that defines a plurality of circumferentially arranged bypass flute channels, the plurality of bypass flute channels extending in the direction of the central axis, and each of the bypass flute channels having a depth HF and a length LF, and the outer surface of the flow centration component defining a cross-sectional dimension that varies as measured along the central axis in the direction from the proximal end to the distal end.

Aspect 2. The flow centration component of Aspect 1, wherein a cross-sectional profile of the flow centration component defines a first portion having a cross-sectional profile that is angled, curved, or otherwise extends away from the central bore, the first portion optionally comprising a portion that is inclined at a first angle $\theta 1$ of from about 5 to about 60 degrees measured relative to the central axis, the first portion extending from an end of the flow centration component.

Aspect 3. The flow centration component of Aspect 2, wherein the cross-sectional profile of the flow centration component defines a second portion having a profile that is angled, curved, or otherwise extends away from the central bore.

Aspect 4. The flow centration component of Aspect 3, wherein the cross-sectional profile of the second portion differs from the cross-sectional profile of the first portion.

Aspect 5. The flow centration component of Aspect 4, wherein at least a portion of the second portion is inclined at a second angle $\theta 2$ measured relative to the central axis, $\theta 2$ being less than $\theta 1$.

Aspect 6. The flow centration component of any one of Aspects 1-5, wherein the cross-sectional profile of the flow centration component defines a portion that is essentially parallel to the central axis.

Aspect 7. The flow centration component of any one of Aspects 1-6, wherein at least one of the bypass flute channels defines a width that varies as measured along the central axis in the direction from the proximal end to the distal end, said width optionally increasing as measured along the central axis in the direction from the proximal end to the distal end.

Aspect 8. The flow centration component of any one of Aspects 1-7, wherein the central bore defines a diameter $D_B$, wherein the flow centration component defines a diameter $D_C$ measured at the widest point of the flow centration component along the central axis, and wherein the ratio of $D_B$ to $D_C$ is from about 2:10 to about 4:10.

Aspect 9. The flow centration component of any one of Aspects 1-8, wherein a bypass flute channel defines a depth $H_F$, wherein the flow centration component defines a diameter $D_C$ measured at the widest point of the flow centration component along the central axis, and wherein the ratio of $H_F$ to $D_C$ is from about 1:20 to about 1:5.1.

Aspect 10. The flow centration component of any one of Aspects 1-9, wherein a bypass flute channel defines a depth $H_F$, and wherein $H_F$ varies as measured along the central axis in the direction from the proximal end to the distal end, said depth $H_F$ optionally increasing as measured along the central axis in the direction from the proximal end to the distal end.

Aspect 11. The flow centration component of any one of Aspects 1-10, wherein a bypass flute channel defines a depth $H_F$, and wherein $H_F$ is from about 100 to about 1000 µm.

Aspect 12. The flow centration component of any one of Aspects 1-11, wherein the flow centration component defines a length $L_C$, and wherein the ratio of $L_C$ to the length $L_F$ of a bypass flute channel is from about 10:5 to about 10:8.

Aspect 13. The flow centration component of any one of Aspects 1-12, wherein the flow centration component comprises an assembly of a plurality of components.

Aspect 14. The flow centration component of any one of Aspects 1-13, wherein the flow centration component comprises a single body.

Aspect 15. The flow centration component of any one of Aspects 1-14, wherein the flow centration component comprises a ceramic material.

Aspect 16. The flow centration component of any one of Aspects 1-15, wherein the central bore defines a central axis, and wherein the central axis of the central bore is offset by less than about 10 µm from the central axis of the flow centration component when measured at one or both of the proximal end of the flow centration component and the distal end of the flow centration component.

Aspect 17. A flow cell assembly, the flow cell assembly comprising: a flow centration component according to any one of Aspects 1-16; a sheath fluid delivery region, the sheath fluid delivery region in fluid communication with the plurality of bypass flute channels at a proximal end of the flow centration component, the sheath fluid delivery region being in fluid isolation from the central bore of the flow centration component at the proximal end of the flow centration component, the flow cell further comprising a focusing region, which focusing region is configured to contain fluid sample flow from the central bore of the flow centration component and sheath fluid flow from the plurality of bypass flute channels, the focusing region defining a central axis, and the flow cell being configured to center a sample fluid capillary engaged with the flow centration component on the central axis of the focusing region.

Aspect 18. The flow cell of Aspect 17, further comprising the sample fluid capillary, the sample fluid capillary being configured to communicate therein a fluid sample that comprises a plurality of particles disposed therein, the capillary being configured to engaged with the central bore of the flow centration component.

Aspect 19. A method, comprising: with a flow centration component according to any one of Aspects 1-16, communicating (1) a fluid sample that comprises a plurality of particles through the central bore of the component; and (2) a sheath fluid within the bypass flute channels of the flow centration component, the communicating being performed such that the sheath fluid hydrodynamically concentrates at least some of the plurality of particles toward a central flow axis.

Aspect 20. The method of Aspect 19, wherein the communicating is performed such that the sheath fluid is free of turbulent flow.

Aspect 21. The method of any one of Aspects 19-20, wherein the sheath fluid hydrodynamically concentrates at least some of the plurality of particles such that the at least some particles lie essentially on the central flow axis.

Aspect 22. The method of any one of Aspects 19-21, further comprising focusing at least some of the plurality of particles by application of acoustic radiation pressure.

Aspect 23. The method of any one of Aspects 19-22, further comprising analyzing at least some of the particles concentrated toward the central flow axis.

Aspect 24. An analysis system, comprising:
a particle handling train, the particle handling train comprising: a sample channel defining an axis of flow and configured to communicate a fluid sample comprising a plurality of particles disposed therein, and a plurality of sheath flow channels arranged circumferentially about the sample channel and arranged essentially parallel to the axis of flow, the plurality of sheath flow channels being configured so as to communicate a sheath fluid therethrough so as to hydrodynamically focus particles of the fluid sample to a central axis of a flow channel; and

a particle analyzer, the particle analyzer configured to analyze the hydrodynamically focused particles in the flow channel.

Aspect 25. The analysis system of Aspect 24, wherein the particle analyzer comprises a laser.

Aspect 26. The analysis system of any one of Aspects 24-25, wherein the plurality of sheath flow channels is enclosed within a flow centrator component.

Aspect 27. The analysis system of any one of Aspects 24-25, wherein the plurality of sheath flow channels is defined between a flow centrator component and a wall of a flow channel.

Aspect 28. A method, comprising: communicating a sheath fluid through discrete channels circumferentially arranged about a flow of a sample fluid that comprises a plurality of particles disposed therein, the communicating being performed such that the sheath fluid hydrodynamically concentrates at least some of the plurality of particles of the flow of the sample fluid toward a central flow axis.

Aspect 29. The method of Aspect 28 wherein the communicating is performed such that the sheath fluid is free of turbulent flow.

Aspect 30. The method of any one of Aspects 28-29, wherein the sheath fluid hydrodynamically concentrates at least some of the plurality of particles such that the at least some particles lie essentially on the central flow axis.

Aspect 31. The method of any one of Aspects 28-30, further comprising analyzing at least some of the particles concentrated toward the central flow axis.

SUMMARY AND ADVANTAGES

1. Highly repeatable due to a single master mold for production process
2. Bypass flutes on perimeter of design act as a flow straightener for the sheath flow. This has the additional advantage of enabling flexibility in the entry angle of the sheath flow into the injection manifold since the streamlines of the sheath flow can be straightened before point of hydrodynamic focus of sample flow.

3. Ease of assembly—simply press fit centrator bullet part into the injection manifold.
4. High precision, low cost for manufacture

What is claimed:

1. A flow centration component, comprising:
the flow centration component defining a central axis, a proximal end, and a distal end, and having a central bore extending within the flow centration component in a direction of the central axis;
the flow centration component defining a splined outer surface that defines a plurality of circumferentially arranged bypass flute channels, wherein each of the plurality of circumferentially arranged bypass flute channels extends continuously from the proximal end to the distal end in the direction of, and parallel to, the central axis, the plurality of circumferentially arranged bypass flute channels extending in the direction of the central axis, and each of the plurality of circumferentially arranged bypass flute channels having a depth HF and a length LF, each of the plurality of circumferentially arranged bypass flute channels maintaining a uniform cross-section profile defined by the depth HF along the length LF, and
the splined outer surface of the flow centration component defining a cross-sectional dimension that varies as measured along the central axis in the direction from the proximal end to the distal end,
wherein a cross-sectional profile of the flow centration component defines a first portion having a cross-sectional profile that is angled, curved, or otherwise extends away from the central bore,
wherein the cross-sectional profile of the flow centration component defines a second portion having a cross-sectional profile that is angled, curved, or otherwise extends away from the central bore,
wherein the cross-sectional profile of the flow centration component defines a central portion situated between the first portion and the second portion, the central portion having a cross-sectional profile that is uniform with respect to the first portion and the second portion, and
wherein the cross-sectional profile of the second portion differs from the cross-sectional profile of the first portion.

2. The flow centration component of claim 1, wherein at least one of the bypass flute channels defines a width that varies as measured along the central axis in the direction from the proximal end to the distal end, said width optionally increasing as measured along the central axis in the direction from the proximal end to the distal end.

3. The flow centration component of claim 1, wherein HF varies as measured along the central axis in the direction from the proximal end to the distal end, said depth HF optionally increasing as measured along the central axis in the direction from the proximal end to the distal end.

4. The flow centration component of claim 1, wherein the central bore defines a central axis, and wherein the central axis of the central bore is offset by less than about 10 μm from the central axis of the flow centration component when measured at one or both of the proximal end of the flow centration component and the distal end of the flow centration component.

5. A flow cell assembly, the flow cell assembly comprising:
the flow centration component according to claim 1;
a sheath fluid delivery region, the sheath fluid delivery region in fluid communication with the plurality of bypass flute channels at the proximal end of the flow centration component, the sheath fluid delivery region being in fluid isolation from the central bore of the flow centration component at the proximal end of the flow centration component,
the flow cell further comprising a focusing region, which focusing region is configured to contain fluid sample flow from the central bore of the flow centration component and sheath fluid flow from the plurality of bypass flute channels,
the focusing region defining a central axis, and
the flow cell being configured to center a sample fluid capillary engaged with the flow centration component on the central axis of the focusing region.

6. The flow cell assembly of claim 5, further comprising the sample fluid capillary, the sample fluid capillary being configured to communicate therein a fluid sample that comprises a plurality of particles disposed therein, the capillary being configured to engaged with the central bore of the flow centration component.

7. A method, comprising:
with a flow centration component according to claim 1, communicating (1) a fluid sample that comprises a plurality of particles through the central bore of the flow centration component; and (2) a sheath fluid within the bypass flute channels of the flow centration component, the communicating being performed such that the sheath fluid hydrodynamically concentrates at least some of the plurality of particles toward a central flow axis.

8. The method of claim 7, wherein the communicating is performed such that the sheath fluid is free of turbulent flow.

9. The method of claim 7, wherein the sheath fluid hydrodynamically concentrates at least some of the plurality of particles such that the at least some particles lie essentially on the central flow axis.

10. The method of claim 7, further comprising focusing at least some of the plurality of particles by application of acoustic radiation pressure.

\* \* \* \* \*